United States Patent
Shuster

(10) Patent No.: US 9,579,575 B2
(45) Date of Patent: *Feb. 28, 2017

(54) ENTERTAINMENT SYSTEM FOR PERFORMING HUMAN INTELLIGENCE TASKS

(76) Inventor: Gary Stephen Shuster, Fresno, CA (US)

(*) Notice: Subject to any disclaimer, the term of this patent is extended or adjusted under 35 U.S.C. 154(b) by 857 days.

This patent is subject to a terminal disclaimer.

(21) Appl. No.: 13/532,675

(22) Filed: Jun. 25, 2012

(65) Prior Publication Data

US 2012/0330445 A1   Dec. 27, 2012

Related U.S. Application Data

(63) Continuation of application No. 12/362,396, filed on Jan. 29, 2009, now Pat. No. 8,206,222.

(60) Provisional application No. 61/024,347, filed on Jan. 29, 2008.

(51) Int. Cl.
  *A63F 13/00*    (2014.01)
  *A63F 13/655*   (2014.01)
  *A63F 13/46*    (2014.01)
  *A63F 13/30*    (2014.01)

(52) U.S. Cl.
  CPC ........... *A63F 13/655* (2014.09); *A63F 13/12* (2013.01); *A63F 13/46* (2014.09); *A63F 2300/5526* (2013.01); *A63F 2300/6009* (2013.01); *A63F 2300/69* (2013.01)

(58) Field of Classification Search
  CPC .. A63F 9/18; A63F 2009/18; A63F 2009/186; A63F 2003/04; A63F 2003/0434; A63F 2300/8064; A63F 13/655

USPC ................................ 463/9, 42; 434/322, 333
  See application file for complete search history.

(56) References Cited

U.S. PATENT DOCUMENTS

| | | | |
|---|---|---|---|
| 5,515,270 A | 5/1996 | Weinblatt | |
| 5,999,882 A | 12/1999 | Simpson et al. | |
| 6,119,229 A | 9/2000 | Martinez et al. | |
| 6,236,933 B1 | 5/2001 | Lang | |
| 6,810,528 B1 | 10/2004 | Chatani | |

(Continued)

FOREIGN PATENT DOCUMENTS

| | | |
|---|---|---|
| JP | 2003111050 A | 4/2003 |
| WO | WO-2005063157 A1 | 7/2005 |

*Primary Examiner* — Allen Chan
(74) *Attorney, Agent, or Firm* — Sherrie Flynn; Coleman & Horowitt LLP

(57) ABSTRACT

A game engine is configured to accept human intelligence tasks as in-game content and present the in-game content to the game player. Human intelligence tasks, such as visual discrimination, are thus enabled in a video game context. The game engine may receive a definition of human intelligence tasks from one or more remote sources present the human intelligence tasks to multiple video game participants as in-game content. The game engine defines and enables game play rules for the in-game content. The game play rules set parameters for the multiple video game participants to perform the human intelligence tasks to achieve desired results. The game engine may award each of the multiple video game participants an improved game score upon successful performance of the human intelligence tasks in accordance with the game play rules. The game engine may measure success by consistency in responses between different participants or trials.

20 Claims, 2 Drawing Sheets

(56) References Cited

U.S. PATENT DOCUMENTS

| | | |
|---|---|---|
| 6,904,360 B2 | 6/2005 | Pechatnikov et al. |
| 7,143,089 B2 | 11/2006 | Petras et al. |
| 7,813,561 B2 | 10/2010 | Jia et al. |
| 7,854,653 B2 | 12/2010 | Kane |
| 2002/0138847 A1 | 9/2002 | Abrams et al. |
| 2003/0072562 A1 | 4/2003 | Vau et al. |
| 2003/0190960 A1 | 10/2003 | Jokipii et al. |
| 2004/0006566 A1 | 1/2004 | Taylor et al. |
| 2004/0030493 A1 | 2/2004 | Pechatnikov et al. |
| 2005/0113170 A1* | 5/2005 | McHugh .................. 463/40 |
| 2005/0277472 A1 | 12/2005 | Gillan et al. |
| 2006/0046834 A1 | 3/2006 | Sekine |
| 2006/0048092 A1 | 3/2006 | Kirkley et al. |
| 2006/0106675 A1 | 5/2006 | Cohen et al. |
| 2006/0112092 A1 | 5/2006 | Ziou et al. |
| 2006/0135264 A1 | 6/2006 | Shaw et al. |
| 2006/0174026 A1 | 8/2006 | Robinson et al. |
| 2006/0179053 A1 | 8/2006 | von Ahn Arellano et al. |
| 2007/0050838 A1 | 3/2007 | Liu et al. |
| 2007/0061487 A1 | 3/2007 | Moore et al. |
| 2007/0087833 A1* | 4/2007 | Feeney et al. ................ 463/42 |
| 2007/0155488 A1 | 7/2007 | Kubota et al. |
| 2007/0174244 A1 | 7/2007 | Jones |
| 2007/0216687 A1 | 9/2007 | Kaasila et al. |
| 2007/0219708 A1 | 9/2007 | Brasche et al. |
| 2007/0219967 A1 | 9/2007 | Mueller et al. |
| 2007/0225076 A1 | 9/2007 | Aida |
| 2008/0010159 A1 | 1/2008 | Rossides |
| 2008/0022211 A1 | 1/2008 | Jones et al. |
| 2008/0076573 A1 | 3/2008 | Loehrer |
| 2008/0102954 A1 | 5/2008 | Schueller |
| 2008/0125226 A1 | 5/2008 | Emmerson |
| 2008/0139315 A1 | 6/2008 | O'Connor et al. |
| 2008/0192116 A1 | 8/2008 | Tamir et al. |
| 2009/0005003 A1 | 1/2009 | Hartwell |
| 2009/0091798 A1 | 4/2009 | Lawther et al. |

\* cited by examiner

ENTERTAINMENT SYSTEM FOR PERFORMING HUMAN INTELLIGENCE TASKS

CROSS REFERENCE TO RELATED APPLICATIONS

This application is a continuation of U.S. patent application Ser. No. 12/362,396 filed Jan. 29, 2009, now U.S. Pat. No. 8,206,822, which claims priority pursuant to 35 U.S.C. §119(e) to U.S. provisional application Ser. No. 61/024,347, filed Jan. 29, 2008, which applications are specifically incorporated herein, in their entireties, by reference.

BACKGROUND

1. Field

The present disclosure relates to a gaming system that distributes tasks for performance by human intelligence and collects task results.

2. Description of Related Art

Various processing tasks exist that are difficult to perform using an automated algorithm, but that are relatively trivial for a human operator. For example, there is a substantial need for identification, characterization, or classification of features of photographs, sounds and other digital data used to produce visual or auditory image output. This identification, characterization or classification either eludes computerized systems or requires human confirmation of computerized analysis. At least one computerized system exists to distribute such tasks to human operators in exchange for renumeration of some kind. For example, Amazon developed a system coined Mechanical Turk (http:/www.mturk.com/mturklwelcome) that pays humans to perform Human Intelligence Tasks. Mechanical Turk defines Human Intelligence Tasks as "simple tasks that people do better than computers." As an example, a person may be able to perform the task of identifying whether a specific type of object (for example, a pizza parlor) appears in a photograph or video sequence easier and more efficiently than a computer.

This model, paying for people to perform tasks, fails where the cost of the labor to perform a task exceeds the value of the tasks. For example, a task may be to identify parking meters in a system similar to Google Earth™. The value to the company seeking the information may be only a tenth of a penny per parking meter. A human operator may perform the task a maximum of 250 times in an hour, on average. Performed by a person, this task may not make financial sense, even when pricing labor in cheap offshore outsourced labor markets.

Complicating this problem, humans often make errors even in those tasks that they are uniquely best suited to perform. Many errors arise through carelessness or just normal momentary lapses in concentration. Some people may intentionally enter incorrect data, either maliciously, or in order to boost their pay rate by creating false results. Accordingly, there is a need for a system that effectively distributes tasks and collects results for human intelligence tasks, for example visual identification tasks, in a more cost-effective manner and in a manner that prevents or corrects erroneous entries.

Various distributed computing systems are known, in which a server distributes processing jobs to a plurality of clients for performance by the client during processor idle time, and collects results. However, the processing tasks in those prior art systems are performed solely by the client processor in cooperation with a server, and do not involve or require human intelligence input. In addition, various methods and systems are known for distributing updated digital image or audio data to be output by a game engine during game play at one or more local clients, for advertising or game enhancement purposes. Some such prior systems also collect use information regarding user interaction with the updated data, e.g., number of views or clicks, and report the use information to a central server for analysis or control of distributed updates. However, such systems do not attempt to solve any defined problem through human interaction via game play. Problem solution through game play requires unique methods and solutions that have not been contemplated in any prior art system. Indeed, it has not been contemplated that game play can be used to solve problems requiring human intelligence input, especially problems involving the identification, characterization or classification of visual images or audible output based on qualities that humans are uniquely adapted to recognize, but that are difficult or impossible to recognize using an automated algorithm.

SUMMARY

There are numerous video and other games where players navigate rich visual, audio or other environments. These games may involve single player scenarios with many players using the same environment, but in instances that do not include other players. Multiplayer and massively multiplayer virtual environments also exist. In general, systems for distributing updated data, including digital data for visual images or audible sounds output during game play, may be adapted for the solution of problems benefiting from human intelligence input.

Before proceeding to solve such problems, they must be defined prior to system input, and broken down to a solution process. The solution process presents digital data as visual or audible output for human interaction in the context of game play, and analyzes game play input to infer the presence or absence (or probability of presence or absence) of some defined quality in discrete pieces of the digital image date. The discrete pieces of data may be perceivable in system output as still images, video clips, sound clips, or some combination of the foregoing. In general the digital image data may be derived from real-world imagery, for example, photographs, video clips, sound recordings, x-ray images, magnetic resonance images, ultrasound images, or any imagery of persons or objects or objects existing in the real world. Such imagery is generally more likely to include human-recognizable qualities that cannot readily be discerned by automated analysis, as compared to computer-generated data that may be more readily characterized by machines than by humans. The problem definition involves determining the digital image data to be processed, the quality or qualities to be determined by human intelligence input during distributed game play, and the desired outputs. A problem definition unit may comprise a server operating a user interface and application that presents possible problem parameters and receives input indicating a selection of parameters defining the problem to be solved. A few examples of such problem parameters are presented in the instant disclosure, which should not be regarded as limiting to the scope of what is claimed.

Once the problem parameters have been defined, a solution generation and administration system may define and operate a solution system designed to operate over a distributed hardware network. Generally the hardware network includes at least one server for distributing the digital image data to a plurality of client devices and client devices at which human intelligence input is received in response to visible or audible output at the client device, during game play. The components of the network are in communication using any suitable network, including but not limited to the Internet, a local area network, cellular telephone network, satellite, cable, or optical fiber network, or some combination of the foregoing. The solution system operating on this hardware network may include server and client application modules designed to receive and distribute the digital image data, receive human intelligence input during game play, provide the input for automated analysis to infer problem solution data, and report solution status and results. Solution systems may be generated manually by a solution engineer, may be automatically generated to work with constrained problem parameters within a defined hardware and software system, or some combination of manual and automatic generation.

The solution system should be designed to address a unique aspect of problems depending on human intelligence input, and particularly on problems depending on identification, characterization, or classification of sensible output according to human-recognizable terms. Namely, the unique aspect that a correct solution depends on correct human intelligence input. At the same time, correctness or reliability of a solution cannot readily be assessed without confirming human intelligence input. If it were otherwise, there would be no need for human intelligence input to solve the particular problem. In addition, problem solving by humans inherently involves a high error rate, either intentional or unintentional. Therefore, a robust solution system should include a confirmation procedure for the human intelligence input, such as, for example, presenting identical digital image data at different times on the same client, and/or at different clients, and assessing consistency between the response inputs received. In general, a high degree of consistency between responses may be used to indicate a correct result, while a high degree of inconsistency correlated to an incorrect or indeterminate result, which may call for further solution or a conclusion that a particular result is indeterminate or uncertain. For example, in some cases it may not be clear just what a particular image represents. Furthermore, identifying a particular image as being indeterminate may make submission of those indeterminate images to prior art systems (such as Mechanical Turk) cost-effective, as the value of a complete, fully determinate set of images may be higher than the cost of identifying the several remaining indeterminate images after applications of the inventions disclosed herein.

Another unique aspect of the problems addressed by the present disclosure is that the human intelligence task to be performed on each piece of human task data may be of such low economic value that a payment-for-services model is not economically feasible. In the alternative, it may be simply desired to save cash requirements or other costs associated with such a model. Furthermore, certain tasks are performed by human brains differently when done in a competitive environment, when done for pleasure, when done in a setting or manner that triggers the fight-or-flight response, or when done for reasons other than remuneration. For example, people may be more likely to trust their instinctive guess as to the fastest path between two points when in a competitive environment where time spent calculating the faster path would reduce the likelihood of victory. It is therefore desirable to solicit and receive the human intelligence input from multiple persons, such as from a massive group of participants, without paying for the input and while still providing the participants with an incentive to participate and to provide correct input. It is known that large groups of participants will willingly participate in online gaming for the entertainment value afforded by the game, the satisfaction of besting others or ones own past achievements by more adroitly performing game requirements, or other intangible benefits. The game system may therefore harness the motivations present in game play to motivate participation in evaluating the human task data, and reward input indicating human intelligence input within the context of the game's reward or scoring system. It should be understood that games or either virtual environments that simulate other people, or even single player games or virtual environments, can also serve as a source of human intelligence input.

Using at least one piece of data for which human identification or other processing is required ("human task data"), a solution system may inject one or more pieces of human task data into a computer game in a manner that includes task data output in play according to the goals of the game. Human task data may include digital image data or other data capable of producing sensible output for which human identification, characterization, or classification is desired. The game may be designed such that user input interacting with image or auditory output appearing in the game provides information about a classification into which a particular piece of human task data falls, or an identification or characterization that pertains to the particular piece of human task data.

For example, it may be desirable to identify the breed of dogs appearing in photographs found on the Internet. A programmer may write software that identifies potential dog images, which may be operated to collect such images from an available database. Alternatively, photographs found on pages with text about dogs, or photographs bearing a file name indicating a dog may be gathered. These images (or the portions thereof that are most likely to be dogs) may be loaded into a walk-through "first person shooter" game. The walkthrough may be performed dynamically or not dynamically. Players may be told that shooting a dog of a specified breed will result in extra points, a higher score, in-game currency, extra ammunition or other in-game rewards within the game context.

Rewards may be given immediately for shooting any human task data, or the rewards may be delayed until after processing of player behavior data takes place. The behavior of players to the injected human task data may then be recorded, optionally transmitted to a centralized data processing facility, and analyzed. If a set number of players "shoot" the dog in image 205 when instructed to shoot a pit bull or a fixed ratio of players do so, the photograph is identified as a pit bull. This assumes also that certain players misidentify the photograph. Accordingly, it may be desirable to use a percentage, such as 80%, for example. The photograph may then be rotated out and/or the players who have "shot" the dog correctly may be given their reward. Thus, scores and rewards may be awarded after the system has measured consistency between a number of user responses to infer a result that a particular image is indeed a pit bull. This analysis may be performed during game play so that the points can be awarded during game play or no later than at the completion of the game when final results are tallied. Other rewards may be awarded prior to analysis. For example, the game may immediately award one point for "shooting" any image presented, and later award five points if the image shot is the same as shot by a majority or super-majority of the participants. An additional incentive can be provided to the first player to correctly identify an image, such as by later awarding reputation points unrelated to the game (such as Microsoft's Xbox Live Gamer Score points). Such an additional incentive could be utilized to offset the disincentive that may be created when an image or task is correctly performed but the system lacks sufficient data to verify the player input and award points based thereon. Another implementation may permit users to undo an incorrect identification (for example, as by clicking an "oops" button after shooting an image of a squirrel when they are tasked with shooting a dog), and may optionally adjust the data utilized by the system and/or the user's score to reflect this correction.

A particularly vexing problem for mathematicians and planners is the "travelling salesman's problem", one of a class of problems known as "NP-complete problems". In one classic example of the problem, a salesman is required to visit N locations in the most time or distance-efficient manner. However, finding the shortest route connecting N points, while solvable by testing every possible combination, is so computationally intensive that it is generally considered to be unsolvable for large numbers of points using existing computing resources. This problem is particularly well suited to the inventions at issue. Human beings spend hundreds of millions of hours annually navigating virtual 3-d environments within computer games. By adapting the map for which the shortest route is sought to a computer game, players would be presented with a digital model of the locations to be visited. The game is structured to require the players to travel between the points, and the relative efficiency of the various routing combinations tried by the players is tracked by the software. Real world factors, such as traffic flow, stop signs, one way streets, speed limits, and other things that impact transit speed can be accounted for by altering the routes within the game (as by lengthening game routes that correspond to lower speed limit real-world streets) and/or by altering the physics used by the game engine or altering the game map in ways that would not be possible within the real world. One such implementation might be to stretch the area of the game map corresponding to the city center (where real world speed limits are low) by different amounts depending on the time of day, with or without expanding surrounding areas of the map (as it is not necessary for game maps to follow laws of physics, allowing for example, a 5 square mile area to contain 10 square miles of territory). Points can be awarded to players for efficiently navigating the route. Alternatively, speed of navigation may simply be incorporated within the game as necessary or useful to a good game score or outcome.

A more complete understanding of the entertainment system for distributing and processing human intelligence tasks will be afforded to those skilled in the art, as well as a realization of additional advantages and objects thereof, by a consideration of the following detailed description. Reference will be made to the appended sheets of drawings which will first be described briefly.

DETAILED DESCRIPTION

Figure 1:
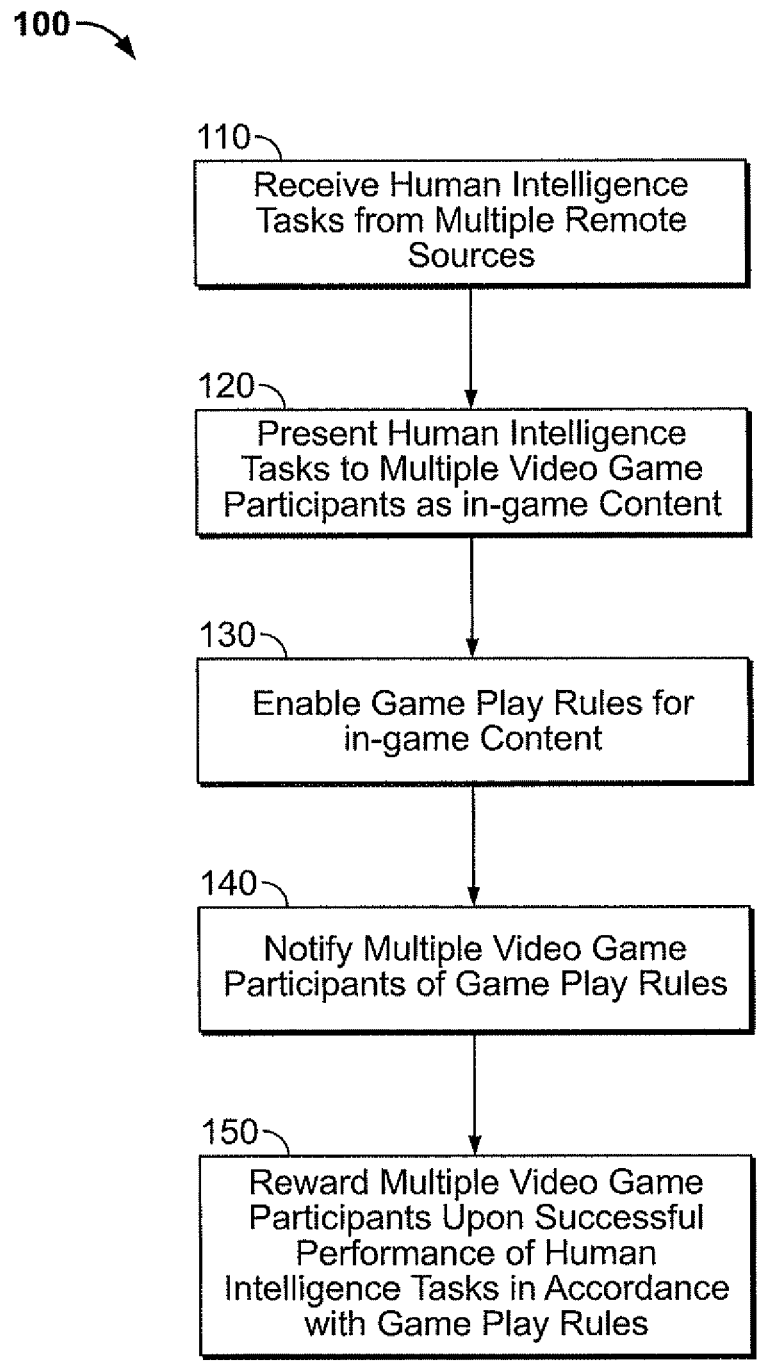
FIG. 1 is a flow chart showing exemplary steps of a method for obtaining and processing human intelligence input that may be performed by an entertainment system for solving problems using human intelligence input.

FIG. 1 is a flow diagram showing exemplary steps of a method 100 of performance of human intelligence tasks in a video game context, as may be performed by an entertainment system for solving problems using human intelligence input. An exemplary system is described later in the specification. At 110, the system may receive human intelligence tasks from multiple remote sources. The human intelligence tasks may comprise identifying photographs or parts of photographs, identifying sounds, or identifying or otherwise indicating any type of audio, video, routing or other type of data. The multiple remote sources may be businesses, online resources, or any other source that requires human intelligence to perform tasks.

At 120, the system may present the human intelligence tasks to multiple video game participants as in-game content. The in-game content may be quasi-content, meaning that the video game programmers did not specifically include the content as part of the video game. Rather, the human intelligence tasks may be adapted to fit the video game using real-life images, sounds or other data, and may be updated at various times after a game is coded and released. Various methods and systems for providing image, video and audio data after game release and including it in output during game play are known in the art, and any suitable method or system may be used. However, such prior art systems should be adapted such that the video, image or audio data is presented in a game context that solicits user input indicative of human intelligence input regarding the video, image, or audio output from the data.

At 130, the system may enable game play rules for the in-game content. The game play rules set the parameters for the multiple video game participants to perform the human intelligence tasks to achieve desired results within the context of game play. The game play rules may, for example, instruct the multiple video game participants in a "first-person shooter" video game to shoot only dogs of a specific breed. Once any given video game participant has achieved the desired results in accordance with the game play rules, the video game participant may receive a reward. At 140, the system may notify the multiple video game participants of the game play rules. At this point, the multiple video game participants may choose to participate in the in-game content for in-game or real-world rewards.

At 150, the system may reward the multiple video game participants upon successful performance of the human intelligence tasks in accordance with the game play rules. Successful performance may be measured by a measured degree of consistency of any action or set of actions within the video game by a given video game participant, as compared to actions my other participants responsive to the same data, or to prior actions by the same participant. The rewards may include in-game benefits, scores, prizes or a form of currency used within the video game, or may involve real-world benefits, prizes or currency.

Figure 2:
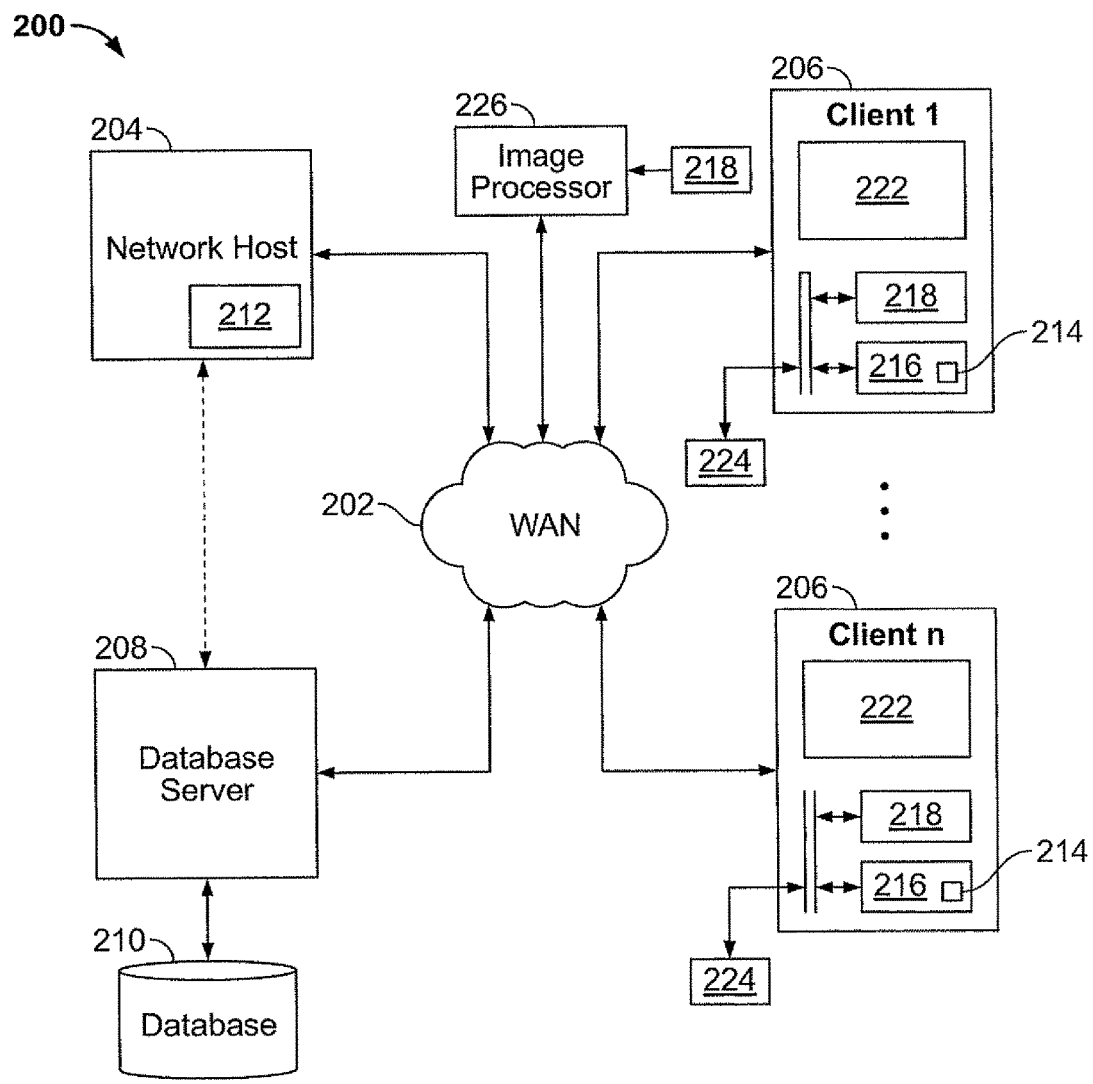
FIG. 2 is a system diagram showing exemplary components of an entertainment system for solving problems using human intelligence input.

FIG. 2 is a block diagram illustrating an exemplary system 200 in accordance with the present disclosure. The system 200 may comprise a network host computer 204, a plurality of clients 206, a database server 208 and a database 210 all in communication via a Wide Area Network (WAN) 202. The WAN 202 may enable communication between the network host computer 204, the plurality of clients 206, the database server 208 and the database 210, and any suitable communication network, or combination of networks, may be used. The network host computer 204 may comprise a content management application 212, which may be encoded on computer-readable media and configured for performing various actions as illustrated in the flowchart of FIG. 1. In the alternative, or in addition, each of the plurality of clients 206 may comprise a content management program 214, which may also be encoded on computer-readable media and configured for performing various actions illustrated in the flowchart of FIG. 1. Some of the actions illustrated in the flowchart of FIG. 1 may be performed by the content management application 212, while others may be performed by the content management program 214. The database server 208 and attached database 210 may be coupled to the network host computer 204 to store the database used in the method illustrated in the flowchart of FIG. 1. Alternatively, the database server 208 and/or database 210 may be connected to the WAN 202 and may be operable to be accessed by the network host computer 204 via the WAN 202.

The plurality of clients 206 may further comprise an internal hard disk or other storage device 216 for storing the game engine 214, a processor 218 for executing the game engine 214 and/or performing other background tasks and an internal bus 220 for internally connecting the storage device 216 and the processor 218. The storage device 216 may also be configured to store the database used method 100. The outputs of the method illustrated by the flowchart of FIG. 1, the notification of violation of the guest requirements and termination of guest access, may be displayed on the clients 206 via a display 222.

In accordance with the foregoing, system 200 comprises a server 204 configured for distributing digital image data to a game client 206 via a computer network 202. The digital image data may represent visible or audible images of physical objects to be output during game play at the client.

The game client 206 is in communication with the server, and comprises a memory 216 holding the game engine 214. The game engine may be configured to operate on the game client 216 output the digital image data as part of game output in response to receiving the digital image data from the server. The game client may receive and store the digital image data during game play, or prior to game play. The game engine may further be configured to contemporaneously output a game environment in coordination with and exclusive of the digital image data. That is, the game environment includes output data that is distinct from the digital image data, for example, background images, icons, sprites, avatars, menu screens, score and status data, and other data as known in the computer gaming arts. Also, the game environment operates in coordination with the digital image data, such that visible or audible output generated from the digital image data is output by the game client as an integrated part of game play.

The game engine 214 is further configured to modify a game reward status indicator, for example, a game score, responsive to user input received by the game client from a user interface device 224 during game play. Examples of user interface devices include keyboards, touch screens, pointers, game controllers, microphones and pointing devices. The game engine is configured such that the modification to the game reward status correlates to a degree of consistency in human discrimination between images or audio clips included in the digital image data, as may be inferred from the user input. For example, more score points may be awarded for input consistent with that received from other clients for the same data, then for inconsistent input. Conversely, points may be deducted for inconsistent input. The game engine may be further configured to output a record indentifying a sequence of the images output during game play correlated to the user input, the record sufficient for inferring a predetermined attribute of ones of the images.

The game client is may be further configured to transmit the record for inferring a predetermined attribute to the server. The server may be configured to receive individual game records from the different game clients. The server may compare such records during game play to assess consistency between responsive inputs received at different game clients. The server may then report on the measured consistency to the game clients, each of which may use the consistency data reported by the server to generate a game score or other game reward status indicator, prior to completion of the game. In the alternative, the server may compute a score or other game reward status indicator and report the computer status indicators or scores to the participating game clients.

In addition, the server may be configured to process the record using an inference algorithm to infer a probability that a predetermined attribute applies to the ones of the images. The predetermined attribute may be an identity of a person or object appearing in the particular images of the digital image data. For example, the attribute may comprise the name of a person, species of animal, or object name (e.g., "fire hydrant"). The predetermined attribute may be a characteristic of a person or object appearing in the particular images of the digital image data. For example, the attribute may comprise an emotional state indicated by a person's face or body language, for example, happy or sad, or a location where a photograph was taken, e.g., "London" or "Paris". The predetermined attribute may be a classification of a person or object appearing in the particular images of the digital image data. For example, the attribute may comprise a label for various human or other classifications, for example, elderly, child, young, sexy, ugly, beautiful, fat, thin, and so forth. The server may assess a probability that a particular attribute applies to a particular image, video clip, or audio clip based on a number and/or percentage of consistent responses. For example, if 90% of responses indicate that a particular image is of a "beautiful woman," the server may infer that there is a high probability that the image indeed shows a beautiful woman. Conversely, for example, if only 30% of the responses agree that the image is of a "beautiful woman," the inferred probability assigned by the server may be quite low.

In the alternative, or in addition, the game client may be configured to process the record using an inference algorithm to infer a probability that a predetermined attribute applies to the ones of the images. This may be appropriate, for example, when a particular client has multiple users or when it is difficult to maintain reliable communications with the host server 204.

System 200 may further include an image processor 226 coupled to the server. The image processor 226 may be configured for generating digital image data from photographic images or other real-world recorded data 228. The image processor may obtain the data 228 from any available database, including database 208. Input image data may also be obtained by searching any available records, for example using an Internet search engine to identify candidate images of a particular person, object, place, or the like. The image processor may convert data 228 to a format suitable for output by game engine 214 during game play.

As part of developing a solution system to a particular problem, the server 204 may be configured to define one or more attributes that are to be determined for images in the digital image data. These attributes may be of a type as previously discussed, and are to be determined in response to user input received by the game clients 206 during via user input devices 224. Another part of solution system development includes generating task definition information. For example, a task definition may include an identification of eligible input images and an attribute label to the attribute to be determined from human intelligence input, for example, "toddler." The task definition may include one of more attributes to be determined. In addition, the task definition may specify other task criteria, for example a minimum number of participants and views per image, a task completion date, eligible game version or application for gathering human intelligence input, and so forth. The server 204 may be configured to distribute the task definition information to the game client 206. The game engine may be configured to output a description of the one or more attributes provided by the task definition during game play. For example, the game engine may output a message instructing players to take specific actions with respect to images having specific attributes, to earn bonus points or other rewards. In general, the game engine is responsive to the task definition to receive and process the digital image data as output for game play.

The server 204 may be configured to divide the digital image data into distinct sets, and to distribute different ones of the distinct sets to different client machines. In other words, each client may receive a different part of the digital image data. These different parts may be overlapping. In the alternative, each client may receive the same digital image data. The server may distribute the digital image data in a single batch to the game client prior to commencement of game play. In the alternative, or in addition, the server may distribute the digital image data to the game clients meted out into a sequence of batches during game play. The digital image data may be pushed to the clients by the server, or pulled by the clients from the server.

The server 204 may distribute the digital image data via operation of a multiplayer game host operating on the server. The multiplayer host may operate in communication with the game engine on the game client to provide a multiuser online game in which multiple participants interact. In such embodiments, the user input indicating human intelligence response to particular task data may be provided directly to the server 204 by the participating game clients. The server may then perform all assessment tasks directed towards problem solution or scoring. In general, the computational and data processing operations necessary for operation of the solution system may be distributed between the client and server in any appropriate fashion.

Having thus described a preferred embodiment of and entertainment system for distributing and processing human intelligence tasks, and method of operating the system, it should be apparent to those skilled in the art that certain advantages of the within system have been achieved. It should also be appreciated that various modifications, adaptations, and alternative embodiments thereof may be made without departing from the scope and spirit of the present technology. The following claims define the scope of what is claimed.

What is claimed is:

1. A system comprising:
    a server;
    a memory operably coupled to the server, the memory holding instructions configured to:
    send a digital image to a plurality of game clients;
    send attribute data comprising at least one predetermined attribute likely contained within the digital image to the game clients;
    receive human intelligence data from at least one game client, the intelligence data indicating whether the at least one game client identified the digital image as containing the predetermined attribute;
    compare the human intelligence data from the plurality of game clients receiving the digital image and attribute data;
    determine a frequency with which game clients identified the digital image as containing the predetermined attribute from comparison of the human intelligence data.

2. The system of claim 1, wherein the instruction are further configured to use an inference algorithm to infer a probability that the predetermined attribute applies to the image based on the frequency.

3. The system of claim 2, further comprising outputting a description of the predetermined attribute during game play.

4. The system of claim 1, wherein the predetermined attribute is an identity of a person or object appearing in the digital image.

5. The system of claim 1, wherein the predetermined attribute is a characteristic of a person or object appearing in the digital image.

6. A system comprising:
    a game client receiving digital image data from a server via a computer network, wherein the digital image data comprises images of physical objects, and
    wherein the game client operates a game engine configured to:
    (a) output the digital image data as part of game output in response to receiving the digital image data from the server;
    (b) contemporaneously output a game environment in coordination with the digital image data;
    (c) generate a game score responsive to user input received by the game client from a user interface device during game play, by increasing the game score in response to a first portion of the user input indicating consistency in human visual discrimination of images included in the digital image data for a user of the game engine and/or reducing the game score in response to a second portion of the user input indicating inconsistency in human visual discrimination of the images; and
    (d) output to the server, a record from the game client identifying a sequence of the images output during game play correlated to the user input.

7. The system of claim 6, wherein the data received by the game client is digital image data from photographic images.

8. The system of claim 6, wherein the user is given a reward based on the game score.

9. The system of claim 8, wherein the reward comprises in-game benefits.

10. The system of claim 6, wherein the digital image data is received by the game client in a single batch.

11. The system of claim 6, wherein digital image data is received by the game client in a sequence of batches.

12. The system of claim 6, wherein the images in the digital image data comprise still photographic images.

13. The system of claim 6, wherein the images in the digital image data comprise video images.

14. The system of claim 6, wherein the game client is configured to operate a multiplayer game, in communication with the server.

15. The system of claim 6, further comprising wherein the game client is further configured to determine one or more attributes for images in the digital image data, in response to user input.

16. The system of claim 15, wherein the game client is further configured to receive task definition information to the game client, the task definition information defining the one or more attributes to be determined.

17. A system comprising:
a server configured to:
distribute digital image data to a game client, the digital image data comprising images of physical objects;
communicate with the game client operating a game engine, wherein the game engine is configured to:
(a) output the digital image data as part of game output in response to receiving the digital image data from the server;
(b) contemporaneously output a game environment in coordination with the digital image data; and
(c) generate a game score responsive to user input received by the game client from a user interface device during game play, by increasing the game score in response to a first portion of the user input indicating consistency in human visual discrimination of images included in the digital image data for a user of the game engine and/or reducing the game score in response to a second portion of the user input indicating inconsistency in human visual discrimination of the images;
receive from the game client, a record identifying a sequence of images output during game play correlated to user input; and
infer a predetermined attribute of at least one of the images based on the record.

18. The system of claim 17, wherein the server is further configured to process the record using an inference algorithm to infer a probability that the predetermined attribute applies to at least one of the images.

19. The system of claim 17, wherein the server is further configured to divide the digital image data into distinct sets, and distributing different ones of the distinct sets to different client machines.

20. The system of claim 19, wherein the server is further configured to receive game records from the different client machines.

* * * * *